June 8, 1926.
A. JOHNSON
1,588,374
APPARATUS FOR TREATING CANNED PRODUCTS
Original Filed Feb. 17, 1919   2 Sheets-Sheet 1
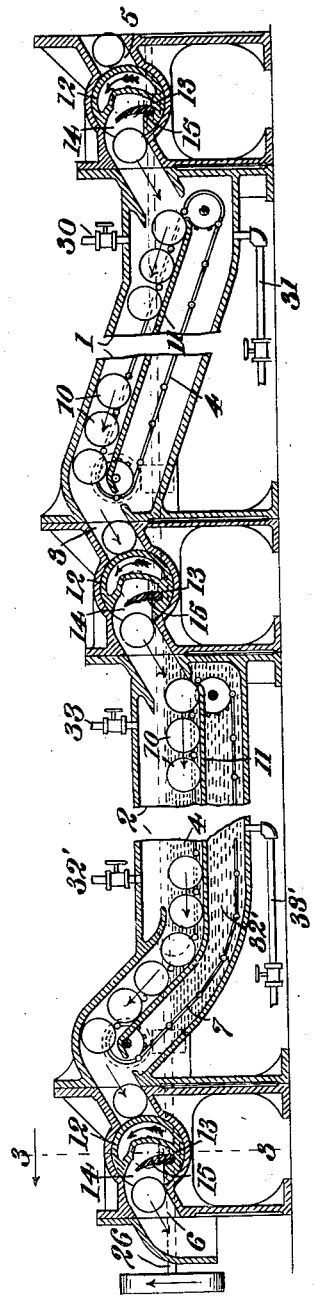
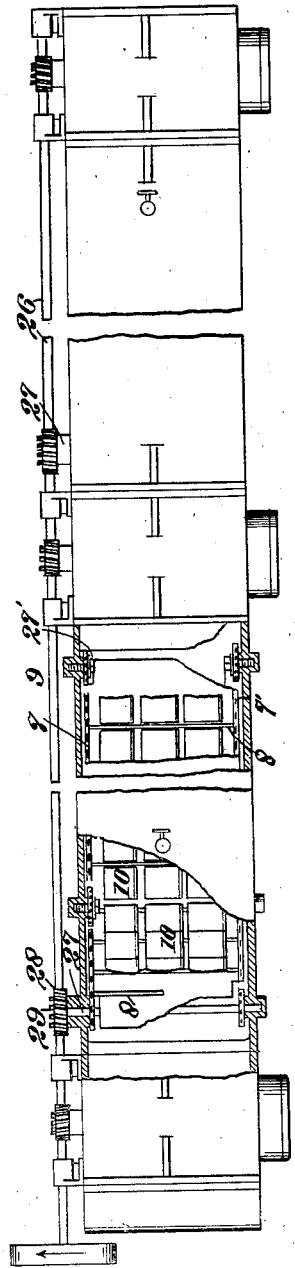

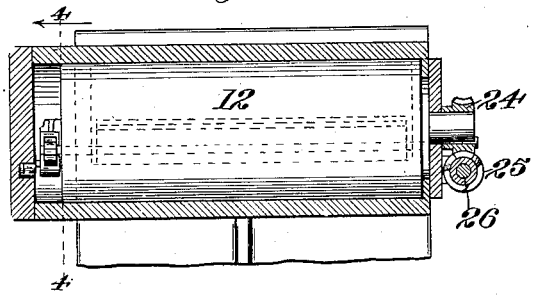
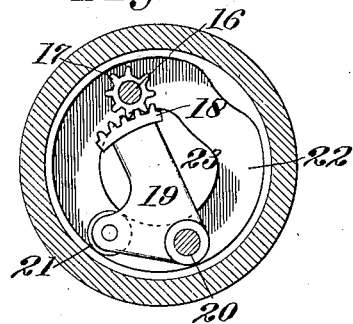
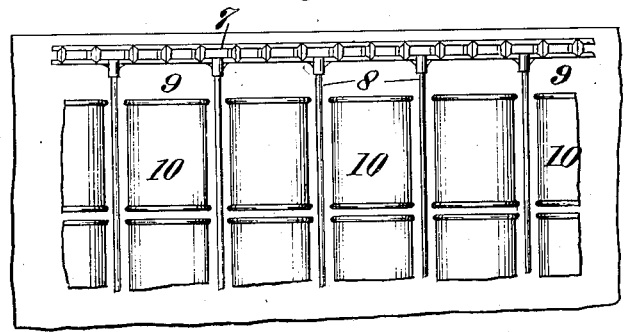

Patented June 8, 1926.

1,588,374

UNITED STATES PATENT OFFICE.

AXEL JOHNSON, OF OAKLAND, CALIFORNIA.

APPARATUS FOR TREATING CANNED PRODUCTS.

Original application filed February 17, 1919, Serial No. 277,384. Divided and this application filed January 19, 1921. Serial No. 438,346.

The hereinafter described invention relates to the processing of food products contained within metallic hermetically sealed containers and is a division of my copending application Serial Number 277,384, filed February 17, 1919.

During the processing of food products within hermetically sealed containers and more particularly such as are required to be subjected to cooking for a considerable period of time, such for instance as corn, it is usual to first treat the sealed filled container within an apparatus known as a "cooker", through which the containers are passed and during their progress therethrough subjected to the action of live steam for a given time (varying in accordance with the food to be treated), after which the treated containers are discharged from within the cooker to the outside. Where the cooking action is a prolonged one, such as required for canned corn, the pressure within the container is raised considerably above atmospheric pressure, to approximately twenty-five pounds, with the result that on the discharge of containers from within the cooker there is a sudden release of pressure, with the result that the internal pressure causes an expansion of the end walls of the container to such an extent as to rupture the union between the ends and the body of the container, the result being a spoiled container and loss of the food product therein. Various methods and means have been employed with the end in view of preventing an expansion of the heated contents causing a rupture of the end walls of the cans or vessels on the discharge thereof from within the cooker, but the same so far as known to me have failed to attain the desired result.

The object of the present invention therefore is to prevent a sudden expansion of the heated products within the metallic containers and a rupture or destroying of the hermetic seal union by a breaking away of the end walls of the containers as delivered from within the cooker.

In carrying out the invention, the filled hermetically sealed containers are passed through a high pressure cooker and while maintained therein their travel therethrough is retarded for a sufficient length of time to permit the action of the heat to properly cook or sterilize the contained food product. During this cooking action which is accomplished by the admission into the cooker of live steam under pressure, the pressure within the cooker is considerably above atmospheric pressure. The food product heated within the cooker under pressure develops a pressure within the container of approximately twenty-five pounds above atmospheric pressure. To prevent the sudden expansion of this pressure on the delivery of the containers from within the high pressure cooker, it is essential that the containers be subjected to a cooling atmosphere at a pressure above atmospheric pressure, and therefore the containers with their heated products are conveyed from the high pressure cooker to a cooling chamber having a pressure therein above atmospheric pressure and preferably a pressure co-extensive with the pressure within the high pressure cooker, the containers during such transfer being protected or maintained free of contact with the outside atmosphere. The containers are maintained within the high pressure cooling chamber until the contents thereof are cooled to substantially atmospheric pressure and then discharged therefrom. When delivered from the cooling chamber, all danger of sudden expansion of the container is removed and rupture of the hermetic seal union between the ends and body thereof eliminated and spoiling of the contents thereof prevented.

In the accompanying drawings, there is illustrated a simple, inexpensive and effective apparatus for the carrying out of the invention, wherein:—

Fig. 1 is a longitudinally broken sectional view of the apparatus.

Fig. 2 is a broken top plan view of the mechanism disclosed by Fig. 1 of the drawings.

Fig. 3 is a transverse sectional view of one of the rotatable controlling valves, taken on the line 3—3, Fig. 1 of the drawings.

Fig. 4 is a vertical section end elevation taken on the line 4—4, Fig. 3 of the drawings, and viewed in the direction of the arrows.

Fig. 5 is a broken detail top plan view illustrative of the conveyer or carrier means employed for propelling the filled containers through the cooking and the cooling units of the apparatus, disclosing filled containers positioned therein.

In the drawings, the numeral 1 designates a high pressure cooker, the same being in the present case connected to a high pressure cooler 2, by means of a valve controlled runway 3, interposed between the said units. Within each of said units, within the cooker and the cooler, there is arranged an endless travelling can carrier or conveyer 4 for receiving and propelling filled cans or containers through the respective units. The hermetically sealed filled cans or containers are delivered into the chamber of the high pressure cooker 1, through a downwardly inclined valve controlled runway 5, and from said chamber into the chamber of the high pressure cooler through the valve controlled downwardly inclined runway 2, while the cooled cans are discharged or make their exit from the chamber of the high pressure cooler through the valve controlled downwardly inclined runway 6, Fig. 1 of the drawings. Each endless carrier or conveyer is the same as to construction and may be of any suitable type capable of conveying the filled cans or containers through the respective units of the apparatus, but in the present case they are illustrated as comprising two endless spaced parallel disposed chains 7 and 7', which are connected at spaced intervals by means of transversely disposed bars 8, Figs. 2 and 5 of the drawings, which said spaced bars provide seats 9 for the reception of the filled cans 10. These cans as propelled through the chambers of the respective units of the apparatus rest on and are supported by means of a longitudinally disposed track 11, Fig. 1 of the drawings. Within each of the runways 5, 3 and 6, controlling the entrance and exit of the filled cans relative to the high pressure cooker and the high pressure cooler, there is situated or located a transversely disposed rotatable valve 12, which valves serve to maintain the respective runways thereof closed. Each valve in construction is the same, and a description of one is thought sufficient for the others. These cylindrical feed and discharge valves rotate within a valve seat 13, formed in the said runways 5, 3 and 6, and the said valves are constructed or formed on one face with a receptacle receiving depression 14 and positioned within each of these depressions is arranged a swinging gate 15, provided at opposite ends with trunnions 16, which trunnions 16 fulcrum at their ends in the end walls of the valves. These gates which are adapted to lie normally against the inner wall of their cooperating chamber when the chambers register with the inlets of the runways 5, 3 and 6, are positively operated to expel the receptacles therefrom on the registry of the chamber with the outlet of the said runways. For this purpose, to one of the trunnions of the swinging gate there is secured a pinion 17, Fig. 4 of the drawings, which meshes with a rack member 18 on the free end of an arm 19, which arm is fulcrumed at its opposite end on a member 20 attached to and carried by one end of the valve 12. The arm 19 adjacent its fulcrum 20 is provided with a lateral extension carrying a roller 21, operating in a cam-groove 22, formed in a plate 23, closing one end of the opening through which the valve is inserted into its seat of the runway controlled thereby, thus a positive operation is imparted to the swinging gate in each valve during the rotary movement of the said valve, as hereinafter set forth.

As stated, each valve is rotatably mounted within the valve seat of the runway controlled thereby and each of said valves carry at one end a worm pinion 24 which intermeshes with a worm 25 on a longitudinally disposed drive shaft 26, the valves being thus adapted for operation in timed relation to the shafts 27 and 27' over which work the endless carrier or conveyer for propelling the cans through the cooker and the cooler. The shafts 27 project at one end beyond one side of the cooker and cooler and have secured thereon a worm gear 28 which meshes with a worm 29 on the shaft 26 for imparting rotation to the shafts 27 for operating the can carriers or conveyers within the chambers of the respective units 1 and 2 of the apparatus.

The sealed receptacles containing the food products to be processed are delivered into the inlet opening of the runway 5 in any suitable manner and are received in the depressed seat 14 of the valve 12 controlling said runway, and by the rotary action thereof conveyed to discharge the filled can into that portion of the runway establishing communication between the valve seat 14 and the chamber of the high pressure cooker 1, being delivered onto the supporting track 11 within one of the can seats of the endless carrier or conveyer by means of which the same are conveyed at an upwardly incline through the cooker and discharged into the runway 3, where the processed cans are received into the seat of the valve controlling the runway 3 and discharged thereby into that portion of the runway establishing communication between the valve seat of said runway and the interior of the cooler 2, being delivered onto the supporting track 11, within said cooler and within one of the seats of the endless travelling conveyer or carrier working within said chamber and by means of which the cans are propelled toward the exit of said chamber and into the upper portion of the runway 6, being received into the depressed portion or seat of the valve 12 controlling the said runway 6 and being carried around and discharged by said valve into the portion of the runway 6 communicating the seat of the valve with the exterior atmosphere.

Live steam under pressure is admitted into the chamber of the cooker 1 through the valve controlled steam supply pipe 30, Fig. 1 of the drawings, and the condensed steam is withdrawn from within the chamber of the said cooker by means of the valve controlled outlet pipe 31. The steam under pressure admitted into the chamber of the cooker, subjects the cans passing therethrough to an external pressure of at least ten pounds per square inch, while the heat to which the cans are subjected during the cooking of the food products raises the interior pressure of the cans to approximately twenty-five pounds, and it is this internal pressure which must be taken care of before the cans are permitted to be brought into contact with the outside atmosphere, or else the sudden release of the cans of external pressure will cause the expansion of the pressure within the cans to burst or break the seal union between the ends of the can and the body thereof. As the cans are delivered from the cooker into the cooling chamber from the valve controlled runway 3, they are preferably immersed within a bath of cold water 32, which water is supplied through the valve controlled water supply pipe 32'. The chamber of the cooler is maintained under a pressure above atmospheric pressure and preferably at a pressure equal to that within the cooker 1, air under water pressure being admitted into the chamber of the cooker 2, through the valve controlled air inlet pipe 33, the excess of water from within the chamber of the said cooler being withdrawn through the valve controlled outlet pipe 33'. The heated cans are thus discharged into the cooling chamber and preferably into a cooling bath and into the atmosphere under a pressure above atmospheric pressure, and this without the cans being permitted to come in contact with the outside atmosphere during the transfer period from the cooker to the cooling chamber, the cans being thus gradually cooled and the interior pressure thereof lowered to substantially atmospheric pressure prior to the discharge thereof from within the cooler.

I do not wish to be understood as limiting or confining the apparatus employed for the carrying out of the method invention to the details of construction of working parts herein shown and described, but on the contrary, wish to be understood as claiming as broadly as the state of the art will permit, any form of a processing apparatus for hermetically sealed food products wherein the containers are subjected to cooking under a high pressure and thence transferred to a cooler under pressure above atmospheric pressure and prevented from being brought into contact with the outside atmosphere during their transfer from the cooking chamber to the cooling chamber.

While I have described the invention as first subjecting the hermetically sealed filled cans to be processed to a heating or cooking atmosphere above atmospheric pressure and thence transferring the cans or containers to a cooling atmosphere above atmospheric pressure and maintaining the same under such pressure until the internal pressure of the can or container has been lowered to substantially atmospheric pressure, it is obvious that any appropriate means may be employed for holding the processed cans or containers confined against undue expansion during the cooling of the same to reduce the internal pressure thereof to substantially atmospheric pressure. If desired, only one unit or chamber may be employed in carrying out the method invention, which may be utilized first as a high pressure cooker and after the hermetically sealed filled cans have been properly processed, the live steam supply may be cut off and cold air under pressure admitted within the said unit for the cooling of the cans to reduce the internal pressure thereof to substantially atmospheric pressure. This dispenses with the transfer of the cans from one unit to another, but the objection thereto is that it is a charge or intermittent operation and necessarily retards the operation of cooking and cooling.

Having thus described the invention what is claimed as new and desired to protect by Letters Patent is:—

1. An apparatus for cooking food products confined within hermetically sealed containers, the same comprising a cooking unit, means for producing within said unit a cooking atmosphere above atmospheric pressure, mechanism for propelling the containers to be treated through said unit, a cooling unit associated with said cooking unit, means admitting into said unit a cooling atmosphere under pressure, devices for transferring the processed containers from the cooking unit to the cooling unit, and mechanism for propelling the containers through the cooling unit.

2. An apparatus for processing food products within hermetically sealed containers, the same comprising a cooking chamber and an associated cooling chamber, a valved controlled communication between said chambers, means for admitting steam under pressure to the cooking chamber and air under pressure to the cooling chamber, a carrier within the cooking chamber for propelling sealed containers therethrough and a carrier within the cooling chamber for conveying therethrough the containers treated under pressure within the cooking chamber, a valved controlled inlet for the admission of the containers to the cooking chamber, and a valved controlled outlet for the cooling chamber through which the containers are discharged from said chamber with the interior pressure thereof reduced to substantially atmospheric pressure.

3. An apparatus for the described purpose comprising a cooking chamber and a cooling chamber, a conveyer within each of the respective chambers, a valve at the inlet end of the cooking chamber and the discharge end of the cooling chamber for controlling the feeding into and the discharge from the respective chambers of cans without directly opening the interor of the chambers to the atmosphere, and an inclined transfer runway between the discharge end of the cooking chamber and the inlet end of the cooling chamber.

4. An apparatus for the described purpose comprising a cooking chamber and a cooling chamber, a conveyer within each of the respective chambers, a valve at the inlet end of the cooking chamber and the discharge end of the cooling chamber for controlling the feeding into and the discharge from the respective chambers of cans without directly opening the interior of the chambers to the atmosphere, a transfer runway between the discharge end of the cooking chamber and the receiving end of the cooling chamber, and a valve within said runway for controlling the passage of cans therethrough and interrupting the direct communication between said chambers through said runway.

5. An apparatus for the described purpose comprising two independent communicating pressure chambers, a conveyer within each, and a single mechanism between said chambers for controlling the passage of containers from one chamber to the other without affording a direct communication between said chambers.

6. An apparatus for the described purpose comprising a pair of independent pressure chambers, a conveyer within each chamber, means for connecting said chambers to provide a transfer of the receptacles from one chamber to the other without exposure of said receptacles to the atmosphere and without affording a direct communication between said chambers.

7. An apparatus for the described purpose comprising a pair of independent pressure chambers disposed in communicating relation, an inclined runway connecting said chambers, and through which receptacles are transferred from one chamber to the other and a valve within said runway for controlling the passage of the receptacles through the same.

8. An apparatus for the described purpose comprising two independent pressure chambers arranged in communicating relation, a conveyer within each pressure chamber, and means between said chambers and at the outer ends thereof for controlling the feed and discharge of receptacles without affording a direct connection between the chambers or between either of the chambers and the atmosphere, and mechanism for operating said conveyers and means in timed relation.

9. A combined cooker and cooler comprising a cooking member and a cooling member; means for independently establishing and maintaining in each a pressure above atmospheric; and means for passing containers from one member to the other without interchange of pressures.

10. A combined cooker and cooler comprising a member having a fluid tight chamber with means for establishing and maintaining a cooking temperature and a pressure above atmospheric therein, said member having a fluid tight inlet valve to said chamber, a fluid tight discharge valve therefrom, and means for advancing containers from said inlet to said discharge valve; a second member having a fluid tight chamber with means for establishing and maintaining a cooling temperature and a pressure above atmospheric therein, said member having an inlet to said chamber, a fluid tight discharge valve therefrom and means for advancing containers from said inlet to said discharge valve; and a fluid tight conduit communicating at one end with the delivery side of the fluid tight discharge valve of the first named member and at the other end opening into the inlet of the chamber of the second member for passing the containers under pressure from the first to the second member.

11. A pressure cooking and cooling apparatus consisting of a pair of separate chambers for cooking and cooling articles under pressure, a valve chamber therebetween and formed in its wall with a port communicating with each chamber, the said ports affording a communication between said chambers, a pocketed carrier valve within said valve chamber interrupting the direct communication between said chambers, an article conveyor within each chamber and each communicating with said valve, and means for operating said valve whereby the same receives articles in a continuous stream directly from the conveyor within the cooking chamber and transfers the same to the cooling chamber and delivers the transferred articles in a continuous stream to the conveyor therein without affording a direct communication between said chambers.

12. In combination a pressure cooker and a cooler and a single valve for transferring objects directly from the cooker to the cooler, said valve being adapted to prevent interchange of pressures between the cooker and the cooler.

13. In combination a pressure cooker, an adjacent cooler, a valve casing directly connected with the cooker and cooler; and a valve in said casing transferring cans from the cooker to the cooler, said valve being adapted to prevent interchange of pressure between the cooker and the cooler.

14. In combination, a pressure cooking member, a cooling member, means for conveying cans successively through the cooker member and through the cooler member, and a single valve for transferring cans from the cooker to the cooler, said valve being adapted to prevent interchange of pressure between the cooker and the cooler.

15. In combination a pressure cooking member, means for conveying cans therethrough; a pressure cooling member, means for conveying cans therethrough; a valve casing directly connected with the outlet of the cooker and the inlet of the cooler, and a single valve in said casing for transferring cans from the cooker to the cooler, said valve being adapted to prevent interchange of pressure between the cooker and the cooler.

16. In combination a pressure cooker, a separate cooler, means for moving cans through the cooker, means for moving cans through the cooler; a valve between and directly connected with the outlet of the cooker and the inlet of the cooler, by which the cans are transferred from the cooker to the cooler, said valve being adapted to prevent interchange of pressure between the cooker and the cooler.

17. In combination with a pressure cooking member and a cooler arranged with the outlet of the cooker beside the inlet of the cooler, means for moving cans through the cooker; means for moving cans through the cooler; a valve casing between and directly communicating with the outlet of the cooker and the inlet of the cooler, and a valve in said valve casing for moving cans therethrough from the cooker to the cooler, said valve being adapted to prevent interchange of pressure between the cooker and the cooler.

18. In combination a cooker and a separate cooler, in both of which a pressure may be maintained above atmospheric, and a single valve for transferring objects from the cooker to the cooler while maintaining a pressure above atmospheric, said valve being adapted to prevent interchange of pressure between the cooker and the cooler.

19. In combination a can cooker, an adjacent can cooler and a valve casing connecting the cooker and the cooler adapted for maintaining pressure above atmospheric in said cooker and cooler and casing, and a single rotary valve in said valve casing for moving cans through said connection from the cooker to the cooler, said valve being adapted to prevent interchange of pressure between the cooker and the cooler.

20. In combination a cooking member wherein pressure may be maintained above atmospheric, a separate cooling member wherein pressure may be maintained above atmospheric, means for conveying cans successively through the cooker member and through the cooler member, and a single valve for transferring cans from the cooker to the cooler while maintaining the exterior pressure thereon, said valve being adapted to prevent interchange of pressure between the cooker and the cooler.

21. In combination with a cooking member wherein pressure may be maintained above atmospheric, means for conveying cans therethrough; a separate cooling member wherein pressure may be maintained above atmospheric, means for conveying cans therethrough; a valve casing directly connected with the outlet of the cooker and the inlet of the cooler, and a single valve in said casing for transferring cans from the cooker to the cooler under pressure, said valve being adapted to prevent interchange of pressure between the cooker and the cooler.

22. In combination a cooker wherein pressure may be maintained above atmospheric, a separate cooler wherein pressure may be maintained above atmospheric, means for moving cans through the cooker, means for moving cans through the cooler; a valve between and directly connected with the outlet of the cooker and the inlet of the cooler, by which the cans are transferred from the cooker to the cooler under pressure above atmospheric, said valve being adapted to prevent interchange of pressure between the cooker and the cobler.

23. In combination with a cooking member wherein pressure is maintained above atmospheric, and a cooler wherein pressure is maintained above atmospheric and disposed adjacent the cooker, the outlet of the cooker being beside the inlet of the cooler; means for moving cans through the cooker: means for moving cans through the cooler a valve casing between and directly com municating with the outlet of the cooker and the inlet of the cooler and in which the pressure is maintained above atmospheric, and a valve in said casing for moving cans therethrough from the cooker to the cooler, said valve being adapted to prevent interchange of pressure between the cooker and the cooler.

24. In combination a pressure cooker, a pressure cooler, a valve casing directly connected with the outlet of the cooker and the inlet of the cooler, means in the cooker for directing cans therefrom into the valve casing, and a valve in said casing for transferring the cans to the cooler, said valve being adapted to prevent interchange of pressure and temperature between the cooker and the cooler.

25. In combination, a cooker, a cooler, means for moving cans through the cooker, means for moving cans through the cooler, a valve casing between and directly connected with the outlet of the cooker and the inlet of the cooler, means in the cooker for directing cans therefrom into the valve casing, and a rotary valve in said casing whereby the cans are transferred from the cooker to the cooler, said valve being adapted to prevent interchange of pressure and temperature between the cooker and the cooler.

26. In combination a cooker, and a cooler arranged with the outlet of the cooker beside the inlet of the cooler; means for moving cans through the cooker; means for moving the cans through the cooler; a valve casing between and directly communicating with the outlet of the cooker and the inlet of the cooler, means in the cooker for directing cans therefrom into the valve casing, and a valve in said casing for transferring cans directly from the cooker to the cooler, said valve being adapted to prevent interchange of pressure and temperature between the cooker and the cooler.

27. An apparatus for the described purpose comprising a cooking chamber and a cooling chamber, a conveyor in each of said chambers; a valve at the inlet end of the cooking chamber and the discharge end of the cooling chamber for respectively controlling the feeding into and the discharge of containers from the respective chambers without directly opening the interior of the chambers to the atmosphere; and means for directing containers from the discharge of the cooking chamber into the inlet of the cooling chamber without exposure to the atmosphere.

28. An apparatus for the described purpose comprising a cooking chamber and a cooling chamber independent one from the other, a conveyor in each of said chambers, a valve at the inlet end of the cooking chamber and the discharge end of the cooling chamber for respectively controlling the feeding into and the discharge of containers from the respective chambers without directly opening the interior of the chambers to the atmosphere, and the said chambers being otherwise closed throughout, means for directing the containers from the discharge of the cooking chamber into the inlet of the cooling chamber without exposure to the atmosphere, and means for maintaining in both chambers a pressure above atmospheric.

In testimony whereof I have signed by name to this specification.

AXEL JOHNSON.